United States Patent

Tzikas

[11] 4,250,102
[45] Feb. 10, 1981

[54] PROCESS FOR THE MANUFACTURE OF AMINOHYDROXYANTHRAQUINONES

[75] Inventor: Athanassios Tzikas, Pratteln, Switzerland

[73] Assignee: Ciba-Geigy AG, Basel, Switzerland

[21] Appl. No.: 69,106

[22] Filed: Aug. 21, 1979

[30] Foreign Application Priority Data

Aug. 25, 1978 [CH] Switzerland .................... 9043/78

[51] Int. Cl.³ .................... C07C 103/75; C07C 97/24
[52] U.S. Cl. .................... 260/377; 260/380
[58] Field of Search ............ 260/377, 380, 382, 371, 260/373

[56]   References Cited
U.S. PATENT DOCUMENTS 2,982,773  5/1961  Grossmann ................... 260/377

Primary Examiner—Winston A. Douglas
Assistant Examiner—Raymond K. Covington
Attorney, Agent, or Firm—Wenderoth, Lind & Ponack

[57]   ABSTRACT

The invention relates to a process for the manufacture of an aminohydroxyanthraquinone of the formula

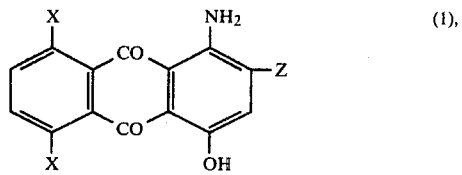

wherein both of X are hydrogen or one X is —NH$_2$ and the other is —OH and Z is hydrogen, $C_1$-$C_4$ alkyl or carboxyl, with the proviso that, if Z is $C_1$-$C_4$ alkyl or carboxyl, both of X must be hydrogen, which process comprises reacting a nitroanthraquinone of the formula

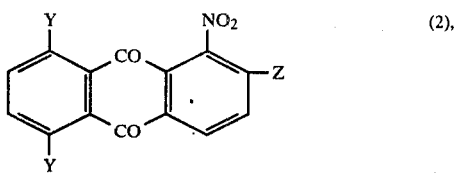

wherein both of Y are hydrogen or one Y is —NO$_2$ and the other is hydrogen and Z is as defined for formula (1), with the proviso that, if Z is $C_1$-$C_4$ alkyl or carboxyl, both of Y must be hydrogen, in an aprotic dipolar solvent, with an alkali metal azide or alkaline earth metal azide, in the temperature range between 0° and 30° C. The reaction products are disperse dyes or intermediates for obtaining vat dyes and disperse dyes.

3 Claims, No Drawings

PROCESS FOR THE MANUFACTURE OF AMINOHYDROXYANTHRAQUINONES

The present invention relates to a process for the manufacture of an aminohydroxyanthraquinone of the formula

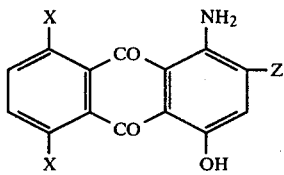

wherein both of X are hydrogen or one X is —$NH_2$ and the other is —OH and Z is hydrogen, $C_1$–$C_4$alkyl or carboxyl, with the proviso that, if Z is $C_1$–$C_4$alkyl or carboxyl, both of X must be hydrogen, which process comprises reacting a nitroanthraquinone of the formula wherein both of Y are hydrogen or one Y is —$NO_2$ and the other is hydrogen and Z is as defined for formula (1), with the proviso that, if Z is $C_1$–$C_4$alkyl or carboxyl, both of Y must be hydrogen, in an aprotic dipolar solvent, with an alkali metal azide or alkaline earth metal azide, in the temperature range between 0° and 30° C.

In addition to hydrogen and carboxyl, examples of possible substituents Z in formulae (1) and (2) are: methyl, ethyl, propyl, isopropyl and butyl.

Starting compounds of the formula (2) can be in particular: 1-nitroanthraquinone, 1,5-dinitroanthraquinone, 1,8-dinitroanthraquinone, 1-nitro-2-methylanthraquinone, 1-nitro-2-ethylanthraquinone and 1-nitro-2-carboxyanthraquinone.

Examples of aprotic dipolar solvents which can be employed in the process of the invention are: N-methyl-2-pyrrolidone, tetramethylurea, sulfolane, hexamethylphosphoric triamide, dimethyl sulfoxide, dimethyl acetamide, diethyl acetamide, acetonitrile, dimethyl formamide, 3,3'-thiodipropionitrile and also pyridine.

Instead of using pure homogeneous solvents, it is also possible to use mixtures of solvents.

Alkali metal azides and alkaline earth metal azides which can be employed in the process of the invention are e.g.: sodium azide, potassium azide, magnesium azide and barium azide. The use of sodium azide is preferred.

The most advantageous reaction temperature depends on the starting compounds and the solvent employed. Preferably, the reaction is carried out at room temperature.

A preferred embodiment of the process of the present invention consists in reacting 1-nitroanthraquinone, 1,5-dinitroanthraquinone or 1,8-dinitroanthraquinone, in dimethyl formamide, with sodium azide to produce 1-amino-4-hydroxyanthraquinone, 1,5-diamino-4,8-dihydroxyanthraquinone or 1,8-diamino-4,5-dihydroxyanthraquinone respectively.

A further preferred embodiment of the process of the invention consists in reacting 1-nitro-2-methylanthraquinone, 1-nitro-2-ethylanthraquinone or 1-nitro-2-carboxyanthraquinone, in dimethyl formamide, with sodium azide to produce 1-amino-2-methyl-4-hydroxyanthraquinone, 1-amino-2-ethyl-4-hydroxyanthraquinone or 1-amino-2-carboxy-4-hydroxyanthraquinone respectively.

The reaction products can be isolated from the reaction mixture in a manner which is known per se.

To remove residues of starting compounds, the reaction products can be precipitated with water and treated with concentrated sulfuric acid, then precipitated once more with water and washed neutral with water.

The aminohydroxyanthraquinone obtainable by the process of the invention can be used as disperse dyes, for example C.I. Disperse Red 15 (Const. No. 60710), C.I. Disperse Red 4 (Const. No. 60755) and Disperse Dye (Const. No. 63600). They can furthermore be used as intermediates for the manufacture of vat dyes and disperse dyes, for example C.I. Disperse Blue 26 (Const. No. 63305) and C.I. Vat Violet 15 (Const. No. 63355).

Compared with the prior art, the process of the present invention affords the advantage that it permits the selective introduction of hydroxyl groups in the para-position to amino groups and further that the corresponding anthraquinone compounds which are substituted in the 2-position can be obtained.

The invention is illustrated by the following Examples, in which the parts are by weight.

EXAMPLE 1

127 parts of 1-nitroanthraquinone are suspended at room temperature in 1000 parts of dimethyl formamide. To this suspension are then added 35 parts of sodium azide. The reaction mixture is then stirred for 8 hours at room temperature and, after addition of 1000 parts of a mixture of ice and water, filtered. The filter cake is washed with water and the moist product (28% paste) is added in the course of 2 hours to 1000 parts of conc. sulfuric acid, taking care that the temperature does not rise above 85° C. The suspension is then heated to 95° C., stirred for 3 hours at 95°–100° C. and, after the dropwise addition of 400 parts of ice-water, filtered hot. The filtrate is then poured into 4000 parts of ice-water and filtered. The filter cake is washed neutral with water, affording 100 parts of 1-amino-4-hydroxyanthraquinone.

Recrystallisation from alcohol yields an analytically pure sample with a melting point of about 209° C.

EXAMPLE 2

The procedure of Example 1 is repeated using dimethyl acetamide instead of dimethyl formamide. The same end product is obtained in a yield of 98 parts.

EXAMPLE 3

The procedure of Example 1 is repeated using potassium azide instead of sodium azide. The same end product is obtained in a yield of 100 parts.

EXAMPLE 4

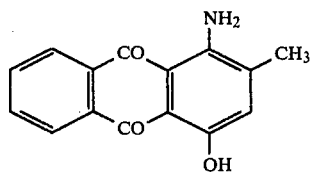

43 parts of 1-nitro-2-methylanthraquinone are suspended at room temperature in 350 parts of dimethyl formamide. To this suspension are then added 18 parts of sodium azide. The reaction mixture is then stirred for 8 hours at room temperature and, after addition of 450 parts of a mixture of ice and water, filtered. The filter cake is washed with water and the moist product (50% paste) is added in the course of 1 hour to 220 parts of conc. sulfuric acid, taking care that the temperature does not rise above 85° C. The suspension is then heated to 95° C., stirred for 3 hours at 95°-100° C., poured into 2000 parts of ice-water and filtered. The filter cake is washed neutral with water, affording 40 parts of crude 1-amino-2-methyl-4-hydroxyanthraquinone. Recrystallisation from alcohol yields an analytically pure sample the IR spectrum of which (in chloroform) is identical with that of commercial product.

EXAMPLE 5

The procedure of Example 4 is repeated using N-methyl-2-pyrrolidone instead of dimethyl formamide. The same end product is obtained in a yield of 38 parts.

EXAMPLE 6

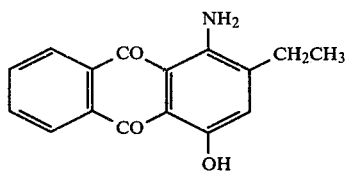

28 parts of 1-nitro-2-ethylanthraquinone are suspended at room temperature in 250 parts of dimethyl formamide. To this suspension are then added 7 parts of sodium azide. The reaction mixture is then stirred for 8 hours at room temperature and, after addition of 400 parts of a mixture of ice and water, filtered. The filter cake is washed with water and the moist product (28% paste) is added in the course of 1 hour to 240 parts of conc. sulfuric acid, taking care that the temperature does not rise above 85° C. The suspension is then heated to 95° C., stirred for 3 hours at 95°-100° C., poured into 3000 parts of ice-water and filtered. The filter cake is washed neutral with water, affording 25 parts of crude 1-amino-2-ethyl-4-hydroxyanthraquinone. Recrystallisation form alcohol yields an analytically pure sample the IR spectrum of which (in chloroform) is identical with that of commercial product.

EXAMPLE 7

The procedure of Example 6 is repeated using sulfolane instead of dimethyl formamide. The same end product is obtained in a yield of 23 parts.

EXAMPLE 8

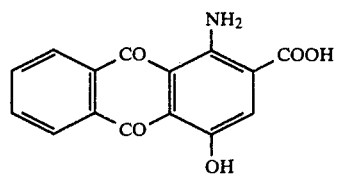

40 parts of 1-nitroanthraquinone-2-carboxylic acid are suspended at room temperature in 320 parts of dimethyl formamide. To this suspension are then added 12 parts of sodium azide. The reaction mixture is then stirred for 8 hours at room temperature and, after addition of 600 parts of a mixture of ice and water, acidified and filtered. The filter cake is washed with water and the moist product (41% paste) is added in the course of 1 hour to 250 parts of conc. sulfuric acid, taking care that the temperature does not rise above 85° C. The suspension is then heated to 95° C., stirred for 3 hours at 95°-100° C., poured into 3000 parts of ice-water and filtered. The filter cake is washed neutral with water, affording 35 parts of crude 1-amino-4-hydroxyanthraquinone-2-carboxylic acid. Recrystallisation from alcohol yields an analytically pure sample the IR spectrum of which (in chloroform) is identical with that of commercial product.

EXAMPLE 9

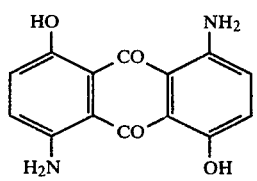

90 parts of 1,5-dinitroanthraquinone are suspended at room temperature in 1000 parts of dimethyl formamide. To this suspension are then added 45 parts of sodium azide. The reaction mixture is then stirred for 8 hours at room temperature and, after addition of 1000 parts of a mixture of ice and water, filtered. The filter cake is washed with water and the moist product (55% paste) is added in the course of 1 hour to 700 parts of conc. sulfuric acid, taking care that the temperature does not rise above 85° C. The suspension is then heated to 95° C., stirred for 3 hours at 95°-100° C. and, after the dropwise addition of 400 parts of ice-water, finely filtered. The filter cake is washed neutral with water, affording 45 parts of 1,5-diamino-4,8-dihydroxyanthraquinone. Recrystallisation from dimethyl formamide yields an analytically pure sample the IR spectrum of which (in KBr) is identical with that of commercial product.

EXAMPLE 10

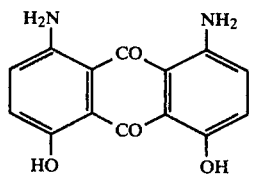

90 parts of 1,8-dinitroanthraquinone are suspended at room temperature in 1000 parts of dimethyl formamide. To this suspension are then added 45 parts of sodium azide. The reaction mixture is then stirred for 8 hours at room temperature and, after addition of 1000 parts of a mixture of ice and water, filtered. The filter cake is washed with water and the moist product (70% paste) is added in the course of 1 hour to 500 parts of conc. sulfuric acid, taking care that the temperature does not rise above 85° C. The suspension is then heated to 95° C., stirred for 3 hours at 95°–100° C. and, after the dropwise addition of 300 parts of ice-water, filtered hot. The filter cake is washed neutral with water, affording 44 parts of 1,8-diamino-4,5-dihydroxyanthraquinone. Recrystallisation from dimethyl formamide yields an analytically pure sample with a melting point of about 290° C.

What is claimed is:

1. A process for the manufacture of an aminohydroxyanthraquinone of the formula

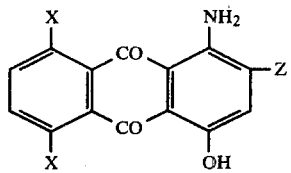

wherein both of X are hydrogen or one X is —$NH_2$ and the other is —OH and Z is hydrogen, $C_1$–$C_4$-alkyl or carboxyl, with the proviso that, if Z is $C_1$–$C_4$-alkyl or carboxyl, both of X must hydrogen, which process comprises reacting a nitroanthraquinone of the formula

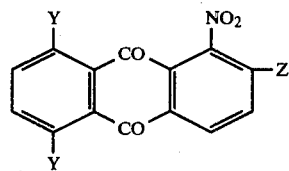

wherein both of Y are hydrogen or one Y is —$NO_2$ and the other is hydrogen and Z is as defined for formula (1), with the proviso that, if Z is $C_1$–$C_4$-alkyl or carboxyl, both of Y must be hydrogen, in an aprotic dipolar solvent or mixtures thereof, with an alkali metal azide or an alkaline earth metal azide, in the temperature range between 0° and 30° C.

2. A process according to claim 1 which comprises reacting 1-nitro-anthraquinone, 1,5-dinitroanthraquinone or 1,8-dinitroanthraquinone, in dimethyl formamide, with sodium azide to produce 1-amino-4-hydroxyanthraquinone, 1,5-diamino-4,8-dihydroxyanthraquinone or 1,8-diamino-4,5-dihydroxyanthraquinone respectively.

3. A process according to claim 1 which comprises reacting 1-nitro-2-methylanthraquinone, 1-nitro-2-ethylanthraquinone or 1-nitro-2-carboxyanthraquinone, in dimethyl formamide, with sodium azide to produce 1-amino-2-methyl-4-hydroxyanthraquinone, 1-amino-2-ethyl-4-hydroxyanthraquinone or 1-amino-2-carboxy-4-hydroxyanthraquinone respectively.

* * * * *